United States Patent [19]

Baugh

[11] 4,288,871
[45] Sep. 8, 1981

[54] DIGITAL LOOP CONFERENCING SIGNAL CORRECTION ARRANGEMENT

[75] Inventor: Charles R. Baugh, Lincroft, N.J.

[73] Assignee: Bell Telephone Laboratories, Incorporated, Murray Hill, N.J.

[21] Appl. No.: 91,406

[22] Filed: Nov. 5, 1979

[51] Int. Cl.³ .......................... H04J 3/08; H04M 3/56
[52] U.S. Cl. ........................................ 370/86; 370/62; 179/18 BC
[58] Field of Search ................... 370/86, 89, 7, 62, 6; 179/18 BC; 371/30

[56] References Cited

U.S. PATENT DOCUMENTS

| | | | |
|---|---|---|---|
| 3,601,543 | 8/1971 | Maniere et al. | 370/86 |
| 4,002,842 | 1/1977 | Meyr et al. | 370/86 |
| 4,048,449 | 9/1977 | Natebusch | 179/18 |
| 4,049,921 | 9/1977 | Zwack | 179/18 |

OTHER PUBLICATIONS

Intel Corp. PCM Code C #2911, Jun. 1978, Preliminary Specification pp. 1-11.

Primary Examiner—Douglas W. Olms
Attorney, Agent, or Firm—David H. Tannenbaum

[57] ABSTRACT

There is disclosed an arrangement for removing error signals on a loop conferencing system. A decay circuit is inserted in the conference loop and all signals passing through the decay circuit are reduced by a constant factor. Those signals which are not regenerated by the valid inputs to the loop are reduced to zero within a few cycles.

7 Claims, 5 Drawing Figures

EXPONENTIAL DECAY ERROR CONTROL CCT 30

DIGITAL LOOP CONFERENCING SIGNAL CORRECTION ARRANGEMENT

BACKGROUND OF THE INVENTION

1. Field of the Invention

This invention relates to digital communication systems and more particularly to such systems where the interstation communication is via a continuous loop.

2. Description of the Prior Art

Digital communication systems of the continuous loop variety are now being looked to for use in situations where the various stations connected to the loop share a close physical proximity to each other. In some applications such systems are called closed-ring time division multiplex systems and may use pulse code modulation. Such a system is shown in U.S. Pat. No. 4,049,921 issued Sept. 20, 1977 to Edward Zwack, which patent is hereby incorporated by reference herein as if reproduced in full.

The Zwack patent discloses a closed loop communication system which allows conferencing between several stations. The stations are connected to the digital loop by an interface circuit which operates to add the instantaneous digital or analog signal onto the conference bus and to remove from the bus that portion of the combined signal which had been placed on the bus via the same interface circuit during the last cycle. The system operates with a delay circuit where the signal from the station is delayed one full cycle at the interface circuit and compared to the incoming signal for the purpose of subtracting from the incoming signal the portion of that combined signal which had been placed on the loop in the previous cycle. A problem exists with such systems in that, while the interface circuits operate to remove signals from the loop which were provided from the associated station nothing protects the loop from signals which have been erroneously placed thereon. The problem stems from the fact that the loop relies upon each interface circuit to remove from the loop those signals placed on the loop by that interface. However, those signals which, for one reason or another, enter the loop because of an error condition remain on the loop and, unless removed, tend to degrade communication.

Thus, it is one object of the invention to arrange a closed-loop communication system in a manner which serves to eliminate errors from the communication loop and to do so in a maner which does not increase the control time and in a manner which preserves the integrity of the loop.

SUMMARY OF THE INVENTION

Advantage is taken of the fact that, in closed loop back-plane wired type systems errors typically appear on the communication bus either from the station or from random signals on the back-plane. In the general situation of such systems broken wires or intermittent cable failures are not a problem. Thus, reliance may be placed on the fact that each station interface circuit performs to remove from the bus those signals placed on the bus from the associated station and the only errors which remain on the bus are those that are generated in random fashion.

Advantage is taken of this fact by incorporating in the closed loop a circuit through which all the communication signals pass. The circuit is arranged with a signal reduction circuit, such as an exponential decay circuit, which operates on all the signals passing therethrough. Thus, after each complete transit of the loop by a signal that signal is reduced by some finite amount. If the signal is valid it will be reinforced by the interface circuit which placed it on the loop in the first instance. If the signal is random there will be no such reinforcement and after several loop transits the erroneous signal will be reduced to essentially zero.

By proper selection of the signal degradation level the one-time reduction to valid signals does not hamper or degrade speech communications.

Accordingly, it is a feature of the invention to provide a serially insertable closed loop control module for reducing the random errors of a closed loop communication system by repetitively decaying all signals passing through the control module.

BRIEF DESCRIPTION OF THE DRAWING

These features and objects as well as others will be more fully appreciated from a review of the drawing in which.

GENERAL DESCRIPTION

Figure 1:
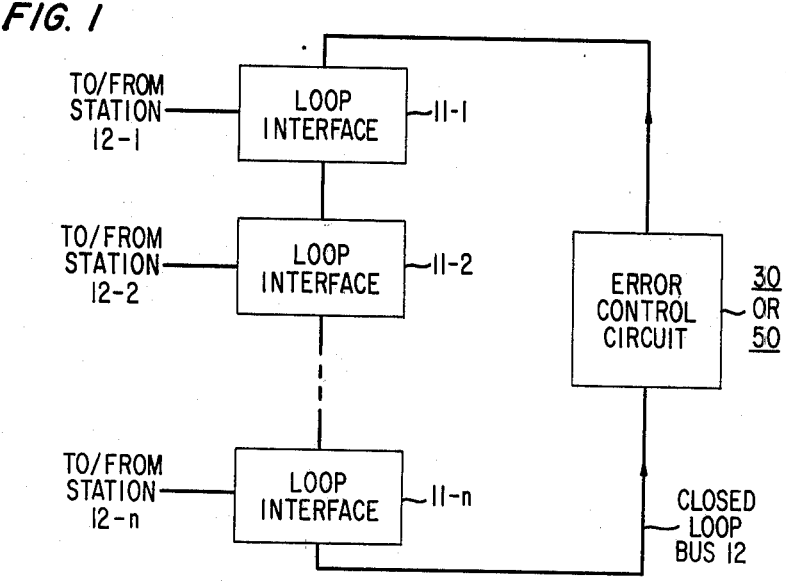
FIG. 1 is a block diagram showing a closed loop communication system.

FIG. 1 shows a generic digital loop architecture for transmitting digital voice information between stations connected to loop 12. The stations are connected to loop interface circuits 11-1 through 11-n in sequential order such that the information on loop bus 12 passes by each loop interface circuit in a sequential manner. The interface circuits may be any type operable for processing information, either analog or digital, between a communication line and the loop. One such circuit for digital loops is shown in the above-mentioned U.S. patent to Zwack. Also connected onto this bus is an error control circuit 30 or 50 which processes the voice information circulating on the closed loop bus to compensate for any errors that are introduced into the digitized voice signals.

When the closed loop bus architecture of FIG. 1 is implemented with digital technology, the voice signals circulating on the closed loop bus and passing through each of the loop interface circuitry 11-1 through 11-n, is represented by a digital voice sample. In order to implement either extension telephones or conferencing features, the voice sample circulating on the loop must represent the accumulated sum of all of the parties in a given telephone conversation. Thus, as the voice sample passes a loop interface circuit of a station active in that conversation, the accumulated sum of all talkers must be updated to represent the new instantaneous value of that voice signal from the station connected to the loop interface.

For example, if the incoming accumulated voice signal on the loop has value 147, and if the previous talker value of this station was 52 and if the present talker value of this station is 312, then the outgoing accumulated voice sample from the loop interface is 407

(147−52+312). If the digital representation of the accumulated sum of the speakers in the conversation is different from the sum from all of the active interface circuits then the signal is in error and that error will remain and circulate around the closed loop bus indefinitely. The function of error control circuit 30 or error control circuit 50 is to process the voice signal in such a way as to eventually reduce the effect of the error on the communication process.

Figure 2:
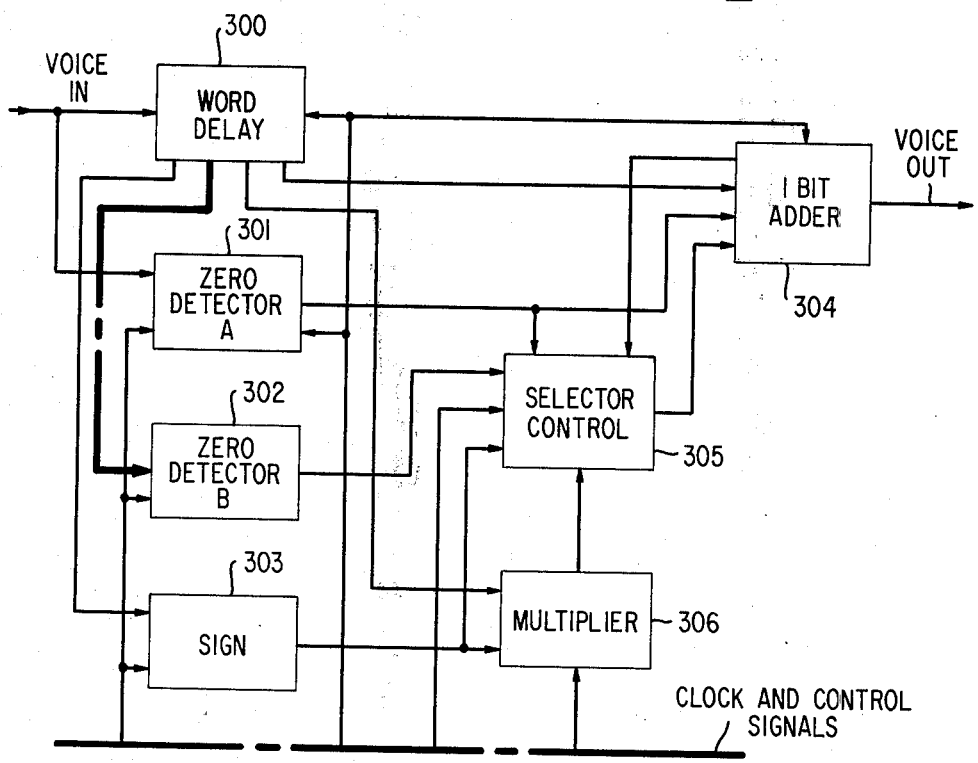
FIG. 2 is a block diagram of an exponential decay error control circuit.
Figure 3:
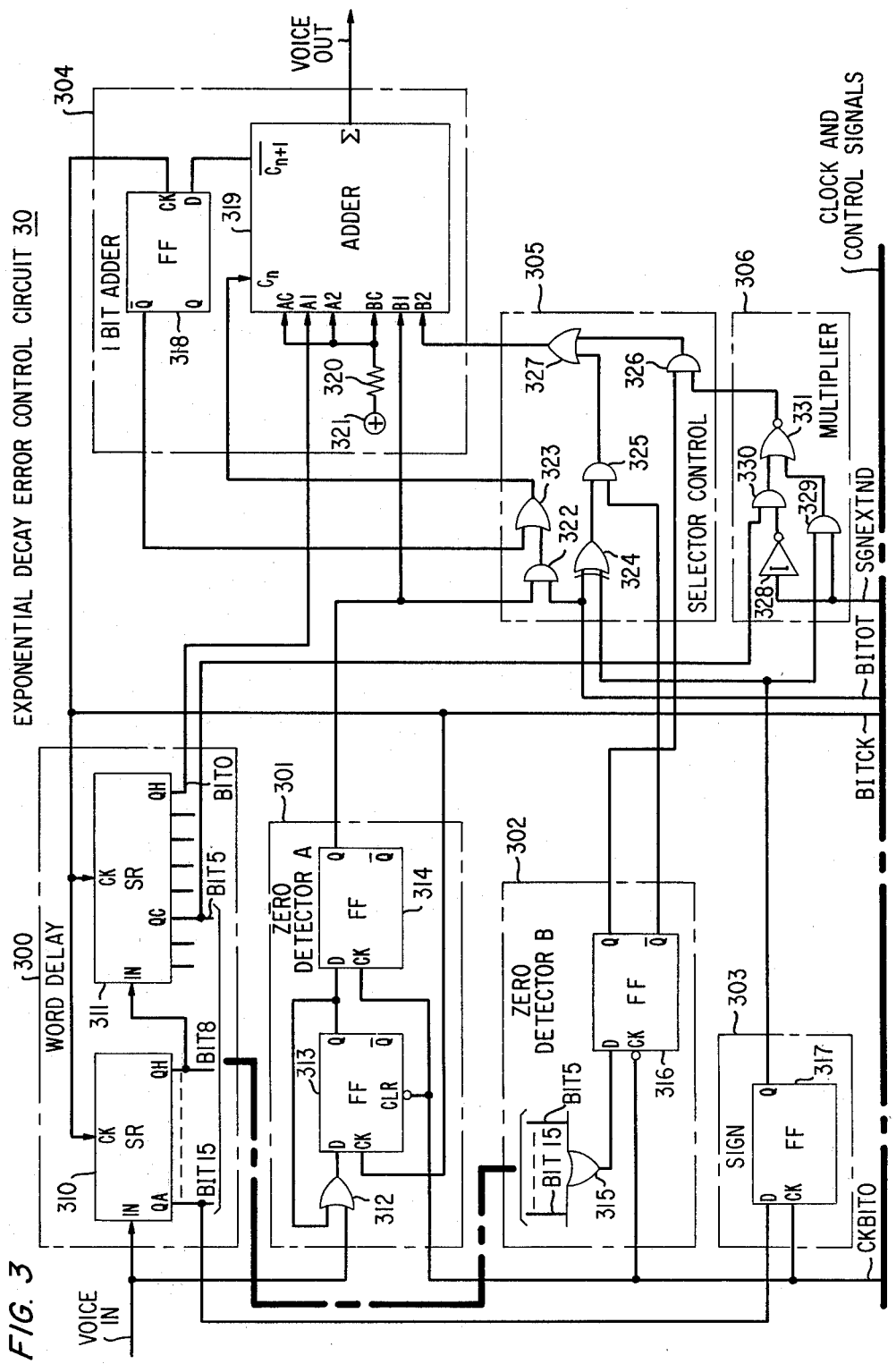
FIG. 3 is a detailed drawing in schematic form of an exponential decay error control circuit.
Figure 4:
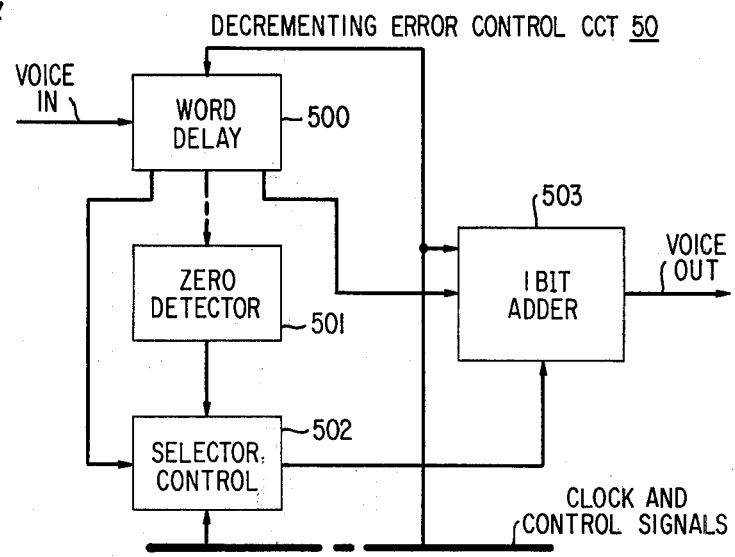
FIG. 4 is a block diagram of an alternate decrementing error control circuit.
Figure 5:
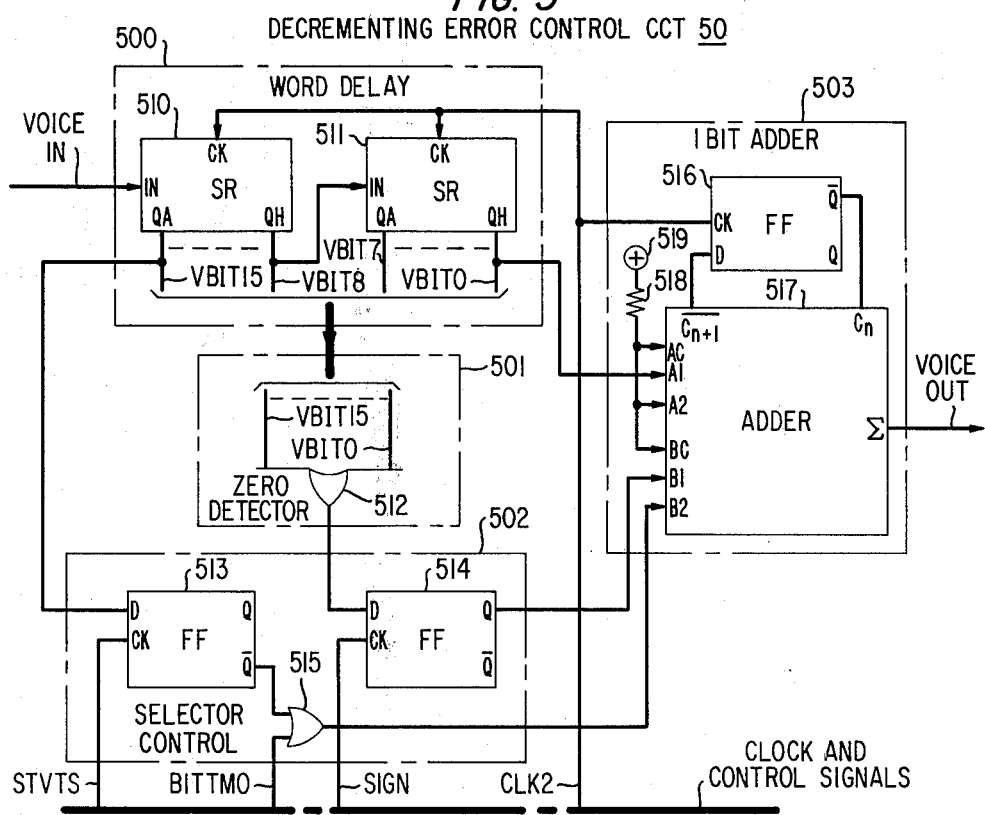
FIG. 5 is a detailed drawing in schematic form of such an alternate decrementing error control circuit.

One solution to the problem of removing an error in the voice signal is to process the voice signal in the error control circuit by reducing its magnitude. FIG. 2 shows a block diagram of an exponential decay, magnitude reduction scheme for implementing the error control circuit. A circuit realization of the exponential decay technique is shown in FIG. 3. FIG. 4 shows another implementation of magnitude reduction error control circuit realized with a decrementing technique. A circuit realization of the decrementing technique is shown in FIG. 5.

Detailed Description

The magnitude reduction technique utilized within either error control circuit 30 or error control circuit 50 as shown in FIG. 1 automatically removes errors from the digital representation of the voice signal circulating continuously around the closed loop bus. The technique of magnitude reduction guarantees that the error signal superimposed on the voice signal will eventually be driven to zero magnitude. For example, if an error is introduced when all speakers within a given conversation remain silent, the erroneously generated voice signal will be driven to zero. This error control scheme works just as effectively when voice is added to the error signal. Thus, any error will eventually be extracted from the circulating closed loop bus and this system will eventually return to normal operations. Two implementations of the magnitude reduction schemes are (1) the exponential decay technique, and (2) the decrementing technique.

EXPONENTIAL DECAY TECHNIQUE

The exponential decay technique for eliminating errors which alter the digital representation of the voice signal derives from multiplying the voice signal by the factor $1-\epsilon$ where $\epsilon$ is considerably smaller than 1. By appropriate choice of the value of $\epsilon$ the error free voice signal is virtually uneffected by the multiplication of $1-\epsilon$. FIG. 2 shows a block diagram for implementing the multiplication of the incoming voice signal by $1-\epsilon$ to produce the output voice signal. The incoming digital voice signal represented in two's complement form is serially shifted into word delay 300. At the same time the incoming digital voice sample is passed to zero detector A 301 in order to determine whether or not the magnitude of the incoming voice signal is zero or non-zero. At the appropriate time in the word delay the arithmetic sign of the sample is latched in sign circuit 303. The voice sample in the word delay is also fed to multiplier 306 to implement $\epsilon$ times the voice sample. Various clock and control signals are fed to these circuits in order to provide the appropriate timing and strobing signals. The output of zero detector B 302, sign 303 and multiplier 306 feed selector control circuit 305. Selector control circuit 305 insures that the output signal feeding 1-bit adder 304 is $\epsilon$ times the incoming voice sample with the polarity that is opposite to the incoming voice signal to realize the $-\epsilon$ multiplication. Adder 304 realizes the sum of the voice sample and $-\epsilon$ times the voice sample.

FIG. 3 shows a circuit implementation of the block diagram of FIG. 2. The voice input serial digital stream is applied to components 310 and 312. This input serial stream is a two's complement representation of the amplitude of the voice signal. The magnitude is represented as an integer value. An incoming serial voice signal is shifted down through 16-bit word delay circuit 300 least significant bit first under control of bit clock BITCK. Simultaneously, the 16-bit digital voice sample is applied to component 312 which drives flip-flop 313.

Zero detector 301 determines the non-zero magnitude by scanning the digital voice sample for any non-zero bit. The result of the scan resides in flip-flop 314. This is implemented by scanning the entire voice sample with components 313 and 312 that catch the first non-zero bit in flip-flop 313 and feed it back into the flip-flop input through OR gate 312. After the entire word is scanned for a non-zero, the non-zero reduction of the output of 314 is used by adder 304 and selector control 305.

Multiplier 306 of FIG. 3 implements an $\epsilon$ value of $2^{-5}$. Since the incoming voice sample is represented as an integer, it is possible for $\epsilon$ times the voice sample to be less than one or, in other words, a fraction. Since adder 304 and the voice sample itself only operate with integers, the output of the multiplier (if it is a fraction) must be replaced by either a plus one or a minus one. Multiplier 306 automatically truncates negative fractional results to minus one. However, the multiplier truncates positive fractional results to the integer zero. Zero detector B 302 detects multiplier results that are less than the integer value one and provides that indication to selector control circuit 305 which inserts the integer one in place of the positive fractional value generated by multiplier 306.

Zero detector B 302 checks the multiplier result by looking for the condition in which bit 5 through bit 15 all have the value zero. This zero condition is strobbed into flip-flop 316 by control signal CKBITO. The outputs of flip-flop 316 are then fed to selector control circuit 305. The sign of the incoming voice signal is stored in flip-flop 317 for use by both multiplier 306 and selector control 305.

Since $\epsilon$ is a power of two, typically $2^{-5}$, the multiplier is readily implemented as a circuit which shifts the incoming voice sample 5 bits toward the least significant bit position and copies the sign which is the most significant bit into the next five most significant bit positions. For example, $\epsilon$ of $2^{-5}$ times the binary number 1101000110111101 results in the binary number 1111111010001101. A control signal to implement the sign extend SGNEXTND is fed to AND gate 329. This signal is also inverted by gate 328 and fed to AND gate 330. The function of the sign extend is to select either the five-bit shifted input voice sample from the QC output of circuit 311 or the sign bit in the output of component 317. Thus, SGNEXTND is low for the least significant 10 bits and high during driving the most significant 6 bits. These two signals are ORed together and inverted by the circuit component 331 which forms the resulting $\epsilon$ multiplication that is fed to selector control circuit 305. There are general purpose multiplier circuits that are well known in the art that can be used in place of the special purpose multiplier 306. The general purpose multiplier can take a continuum of values between 0 and 1.

The selector control circuit routes the product arriving at AND gate 326 or the plus or minus one signal generated at AND gate 325 to the B2 input of adder circuit 319. The plus/minus one value is generated by exclusive OR gate 324 by means of the sign input generated from the Q output of 317 and control signal BITOT that is high during the least significant bit time. AND gate 325 ANDs that plus or minus one signal with the output of zero detector B circuit 302. If multiplier 306 output has a positive value less than integer one, the plus one signal generated at exclusive OR gate 324 should be routed to the B2 input of the adder. If, however, the product generated by multiplier 306 does not have a value between 0 and 1, the Q output of flip-flop 316 will be low thereby routing the product signal from AND gate 326 to the B2 input of the adder.

Gates 322 and 323 establish the carry input $C_N$ input for the initial value during the least significant bit of each voice sample. This is done by means of control signal BITOT combined with the output of zero detector A 301. One bit adder circuit 304 consists of an adder 319 and a flip-flop 318. The carry output of the adder feeds the carry flip-flop 318 which in turn is fed back through OR gate 323 to the carry input of adder 319. One of the two inputs of the adder, namely A1, is fed directly from the word delay shift register output QH of shift register 311. The other input B2 of the adder is driven by the selector control circuit 305. A control input B1 of the adder is fed from zero detector A 301. The control input B1 blocks input B2 to the adder upon the condition that the input voice sample driving the word delay shift register 310 has a magnitude of zero. In this case the adder input which is active consists entirely of input A1. The adder input B2 is blocked by the control signal with the net effect of having the signal arriving at A1 having the value zero added to it such that the sum output is equal to the A1 input. This insures that a signal of magnitude zero arriving at the exponential decay error control circuit will exit from the exponential decay error control circuit with its value maintained at the magnitude of zero.

DECREMENTING ERROR CONTROL CIRCUIT

FIG. 4 shows a block diagram of the decrementing error control technique for implementing magnitude reduction error control circuit 50. The decrementing technique centers around decrementing the magnitude by one. Since the incoming digitized voice sample has its magnitude encoded as an integer value, the decrementing of the signal takes place by subtracting unity from its present value.

The block diagram consists of four components, a word delay 500, zero detector 501, a selector control circuit 502 and a one bit adder 503. Several clocking control signals provide the necessary sequencing of the operations. The zero detector 501 checks for the incoming voice sample having a magnitude of zero. If the magnitude is zero, the selector control circuitry inhibits the decrementing of the voice signal so as to maintain its magnitude at the zero value. If the magnitude is nonzero, the selector control circuit 502 presents a value of one with the polarity opposite to the incoming voice sample to the one bit adder 503 which implements the decrementing.

FIG. 5 shows a circuit realization of the functional block diagram of FIG. 4. Assume the digitized voice sample is encoded in two's complement form of 16-bits with the least significant bit arriving first. This serial digital stream arrives at shift register 510 and is sequentially shifted through word delay 510, 511 by means of the clock signal CLK2. The outputs QA through QH of both 510 and 511 feed the zero detector 501 at the input to the OR gate 512. The output of OR gate 512 presents an indication of zero magnitude to the input of flip-flop 514. It is clocked into the flip-flop by means of the control signal SIGN. The sign bit is clocked into flip-flop 513 during the bit time in which the shifting voice sample has its sign bit at the QA output of shift register 510. The control signal STVTS strobes the sign into flip-flop 513 at that time.

Selector control circuit 502 generates a plus one or minus one input by means of OR gate 515 and the control signal BITTNO. The output of gate 515 is a 16-bit two's complement representation of plus one or minus one depending upon whether the Q output of flip-flop 513 is a one or a zero. If the Q output is one, the output of gate 515 will always be high representing a minus one. If the Q is zero, the output of gate 515 will be high only during the least significant bit time and low thereafter. This represents a plus one.

One bit adder circuit 503 consists of an adder 517 and a carry save flip-flop 516 to form a one bit serial adder whose output is the output digital voice sample. The inputs to the adder are A1 and B2. Thus, the adder performs the sum of the two's complement numbers presented at A1 and B2. The selector control circuit also generates a control signal presented to the adder on input B1. This control signal inhibits input B2. It has the effect of presenting a zero value at the B2 input. If the magnitude of the incoming voice sample is zero, a zero will be clocked into flip-flop 514 and the Q output of flip-flop 514 will inhibit the B2 input of adder 517. This blocks input B2 of adder 517 with the result that the incoming voice signal on input A1 is not decremented and maintains its magnitude value of zero. In this manner the decrementing error control circuit will maintain the magnitude of the incoming voice signal at zero during those cases in which the input voice signal has magnitude zero.

CONCLUSION

While much of the discussion in the description has been centered around the use of a digital system it must be understood that the inventive concept may be used in any communication system, either digital or analog and for any type of communication signal, such as data, as well as voice. To this end one skilled in the art may advantageously use the concepts taught herein in varied system applications without departing from the spirit and scope of the invention.

The decrementing error control technique is the invention of someone other than myself and is shown in this application strictly for the purpose of illustrating that there is more than one implementation to my inventive concept.

I claim:

1. An error correction circuit for use in a continuous loop communication system where a plurality of communication stations have access thereto via interface circuits associated with each station, said error correction circuit comprising means for sampling the combined loop signal at a particular location within said loop, signal reduction means, means for modifying each said sampled signal by said signal reduction means so as to provide a new combined signal, said combined signal having a smaller absolute mathematical value than said sampled signal, and means for substituting on said loop said combined signal for said sampled signal.

2. The invention set forth in claim 1 wherein said signal reduction means includes a circuit having a $1-\epsilon$ multiplication factor where $\epsilon$ is considerably smaller than 1.

3. The invention set forth in claim 2 where $\epsilon$ is on the order of $2^{-5}$.

4. In combination, a communication system wherein a plurality of interface circuits are operative to place communications on a common bus interconnecting said interface circuits and wherein said communications pass through said interface circuits in sequential fashion, an error control circuit inserted in said bus such that all said communications pass through said error control circuit, said error control circuit comprising, means for sampling the communication signal passing through said circuit, signal reduction means, means for modifying each said sampled signal by said signal reduction means so as to produce a new combined signal, said combined signal having a smaller absolute mathematical value than said sampled signal, and means for substituting on said bus said combined signal for said sampled signal.

5. The invention set forth in claim 4 wherein said signal reduction means includes a circuit having a $1-\epsilon$ multiplication factor where $\epsilon$ is on the order of $2^{-5}$.

6. The invention set forth in claim 5 wherein said communication signals pass through said error control circuit as a series of discrete composite signal values and wherein said error control circuit includes means for determining the polarity of each said composite signal, and means for controlling said modifying means in accordance with said polarity means.

7. An error correction circuit for use in a continuous loop communication system where a plurality of communications stations have access thereto via interface circuits associated with each station and connected in said loop, said error correction circuit being adapted to be connected in series with said loop and comprising sampling means for sampling an applied loop signal and signal reduction means operable for reducing each said sampled signal and for affording an output signal for application to said loop in place of said sampled loop signal.

* * * * *